United States Patent
Wang

(10) Patent No.: US 7,120,863 B1
(45) Date of Patent: Oct. 10, 2006

(54) METHOD, SYSTEM, AND PROGRAM FOR INTERFACING WITH ELEMENTS IN A DOCUMENT

(75) Inventor: I-Shin Andy Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,213

(22) Filed: Nov. 15, 1999

(51) Int. Cl.
*G06F 17/00* (2006.01)
(52) U.S. Cl. ............................ 715/513; 707/7; 707/205
(58) Field of Classification Search ................ 707/513, 707/7, 205; 715/513; 709/328
See application file for complete search history.

(56) References Cited

U.S. PATENT DOCUMENTS

| | | | | |
|---|---|---|---|---|
| 5,706,502 | A | 1/1998 | Foley et al. | 528/422 |
| 5,802,530 | A | 9/1998 | Van Hoff | 715/513 |
| 5,842,020 | A | 11/1998 | Faustini | 717/111 |
| 5,845,299 | A | 12/1998 | Arora et al. | 715/513 |
| 5,857,197 | A | 1/1999 | Mullins | 707/103 |
| 5,864,862 | A | 1/1999 | Kriens et al. | 707/103 |
| 6,083,276 | A * | 7/2000 | Davidson et al. | 717/107 |
| 6,085,198 | A * | 7/2000 | Skinner et al. | 707/103 R |
| 6,249,291 | B1 * | 6/2001 | Popp et al. | 345/473 |
| 6,253,228 | B1 * | 6/2001 | Ferris et al. | 709/203 |
| 6,262,729 | B1 * | 7/2001 | Marcos et al. | 345/744 |
| 6,477,701 | B1 * | 11/2002 | Heistermann et al. | 717/108 |
| 6,496,202 | B1 * | 12/2002 | Prinzing | 345/762 |
| 6,651,108 | B1 * | 11/2003 | Popp et al. | 719/315 |
| 2002/0133637 | A1 * | 9/2002 | Popp et al. | 709/315 |

FOREIGN PATENT DOCUMENTS

| | | |
|---|---|---|
| AU | A53031 | 10/1998 |
| JP | 07 160703 | 6/1995 |
| JP | 09 146931 | 5/1997 |
| JP | 10 091446 | 1/1998 |
| JP | 10 111866 | 4/1998 |
| JP | 10 143507 | 5/1998 |
| JP | 10 283346 | 10/1998 |
| JP | 10 083398 | 12/1998 |

OTHER PUBLICATIONS

Gutentag, et al. "The Evolution of Sun's AnswerBooks: A Case Study: Report from the Trenches", *SGML Europe '97j Conf. Pro* 283-292, 1996.
M. Bryan, "An Introduction to the Extensible Markup Language (XML)", The SGML Centre, 1997, pp. 1-7.
W3C XML Working Group, "Extensible Markup Language (XML) 1.0", REC-xml-19980210, Feb. 1998, pp. 1-32.
Batt, P., "Das Netz Beginnt Zu Leben [The Net Comes to Life]", *Bulletin SEV/VSE*, No. 9, 1996, pp. 11-16.

(Continued)

*Primary Examiner*—Sanjiv Shah
(74) *Attorney, Agent, or Firm*—David W. Victor; Konrad Raynes & Victor LLP

(57) ABSTRACT

Disclosed is a system, method, and program for generating an interface to elements in a document. The document defines a relationship of the elements and at least one attribute for each element. A class is generated for at least one element to implement methods from information provided on elements in the document and a mapping indicating at least one element in the document to map to a class. The at least one indicated element in the document for which the class is generated can be accessed and affected by the methods implemented in the class.

30 Claims, 5 Drawing Sheets

OTHER PUBLICATIONS

Daemisch, Karl-Ferdinand, "Network Computing- Alter Wein in Neuen Schlauchen? [Network Computing- The Same Old Thing in New Clothing?]", *Elektronik [Electronics]*, No. 5, Mar. 4, 1997, pp. 122-126.

Goldammer, G., "HTML-Scripts Calls Java Applet . . . A New Development Technique Under a Software- and Applications-Technology Configuration", *Information Management*, vol. 11, No. 3, Aug. 1996, pp. 6-14.

Gragopoulos, I. & F. Pavlidou, "A Novel Client/Server Tool for Updating/Maintaining/Constructing Pages Directly at the Web Server", *Proceedings of International* Conference on Telecommunication, ICT '98, Jun. 1998, pp. 404-409.

Gutentag. E. & J. Suttor, "The Evolution of Sun's AnswerBooks: A Case Study: Report from the Trenches", *SGML '97 Conference Proceedings*, SGML Europe '97, May 1997, pp. 283-291.

Huck, G., P. Fankhauser, K. Aberer, & E. Neuhold, "Jedi: Extracting and Synthesizing Information from the Web", *Proceedings of the 3rd IFCIS International Conference on Cooperative Information Systems*, Aug. 1998, pp. 32-43.

Makela, R., T. Vendelin, & R. Sundquist, "Keep it Simple- Interactive Electronic Application with SGML", *SGML '97 Conference Proceedings*, SGML Europe '97, May 1997, pp. 273-276.

Marti, J., "Viewing IGES Files Through VRML", *Proceedings of the 8th conference on Visualization '97*, Visualization '97, Oct. 1997, pp. 471-474.

Mikula, N.H., "PdoS- Pinnacles DSSSL-O Stylesheet: Stylesheet Design for Online and Paper-Based Delivery", *SGML '97 Conference Proceedings*. SGML Europe '97, May 1997, pp. 233-244.

North, K., "Dynamic Servers and Web Pages in a Database", [online] Dec. 1998, [Retrieved on Feb. 7, 2005]. Retrieved from the Internet at <URL:http;//www.newarchitectmag.com/print/>.

North, K., "Java, JDBC, Stored Procedures, and Server-Mania", [online] May 1998, [Retrieved on Feb. 7, 2005]. Retrieved from the Internet at <URL:http://www.newarchitectmag.com/print/>.

Singleton, A., "Wired to the Web", *Byte*, vol. 21, No. 1, Jan. 1996, pp. 77-80.

Tamura, K., "Description and Programming for XML Processors", *Journal of Japanese Society for Artificial Intelligence*, vol. 13, No. 4, Jul. 1998, pp. 515-518.

Vitali, F., C. Chiu, & M. Bieber, "Extending HTML in a Principled Way With Displets", *Computer Networks and ISDN Systems*, vol. 29, 1997, p. 1115-1128.

Von Tetzchner, J.S., "The World Wide Web Revolution", *Telektronikk*, vol. 93, No. 2, 1997, pp. 12-21.

Wittenbrink, C.M., K. Kim, J. Story, A. Pang, K. Hollerbach, & N. Max, "PermWeb: Remote Parallel and Distributed Volume Visualization", *Proceedings of SPIE Visual Data Exploration and Analysis IV*, SPIE's Electronic Imaging '97, Feb. 1997, pp. 100-110.

Jacobs, S., M. Gebhardt, S. Kethers, & W. Rzasa, "Filling HTML Forms Simultaneously: CoWeb-Architecture and Functionality", Computer Networks and ISDN Systems, 1996, vol. 28, Nos. 7-11, pp. 1385-1395.

\* cited by examiner

```
<xml version = "1.0".
<Catalog name = "pc-catalog">
<Item type = "Desktop PC" id="92" sub-type="6899" serial="689923F007">
<Description>
For the office, the IBM OfficePro offers today's most sophisticated,
cost-effective, industry standard technologies.
</Description>
<Specification>
<Processor type="Pentium Pro" speed="200" unit="MHz"/>
<Memory type="DIMM" size="5" unit="GB"/>
<Diskdrive type="SCSI" size="5" unit="GB"/>
</Specification>
<Price value="2000" unit="US"/>
</Item>

<Item>
...
</Item>

<Item>
...
</Item>

...

</Catalog>
```

METHOD, SYSTEM, AND PROGRAM FOR INTERFACING WITH ELEMENTS IN A DOCUMENT

BACKGROUND OF THE INVENTION

1. Field of the Invention

The present invention relates to a method, system, and program for generating an interface to elements in a document.

2. Description of the Related Art

The Extended Mark-up Language (XML), which is a subset of the Standard Generalized Markup Language (SGML), is designed to provide the capability to exchange structured documents over the Internet. XML files clearly mark where the start and end of each of the logical parts (called elements) of an interchanged document occur. For instance, if the XML document defines a book, the elements would include the table of contents, chapters, appendices, etc. The XML document includes a definition of each element in a formal model, known as a Document Type Definition (DTD). The DTD provides attributes for each element and indicates the relationship of the elements. Elements may be arranged in a hierarchical relationship. In such case, the DTD would define the hierarchical relationship of the elements to one another. Further details of XML are described in the publication "Extensible Markup Language (XML) 1.0, document no. REC-xml-19980210 (Copyright W3C, 1998), which publication is incorporated herein by reference in its entirety.

Users can encode and view an XML document with the Document Object Model (DOM) application program interface (API). The DOM interface is described in the publication entitled "Document Object Model (DOM) Level 1 Specification, Version 1.0," document no. REC-DOM-Level-1-19981001 (Copyright W3C 1998), which publication is incorporated herein by reference in its entirety. The DOM interface represents the document as a hierarchical arrangement of nodes. When applied to the XML document, each node comprises one of the elements. For instance, the user may define the DTD (1) below to include elements of a book.

```
<?xml version="1.0"><Book title=" The NetRexx
    Language>

<Contents>. . . <Contents><Chapter
    title="Background". . . </Chapter>

<Chapter title="Overview". . . </Chapter><Chapter
    title="Definition">. . .</Chapter>

<Appendix>. . . </Appendix></Book>                          (1)
```

The DOM interface would represent the above elements in the tree illustrated in FIG. 1. To access elements in the node, the user must generate code to traverse the hierarchical nodes by specifying the node number. For instance, to access the title attribute of the "Background Chapter" element defined in the DTD (2) above, the following code (2) is needed:

```
Element bookElement= document.getDocumentEle-
    ment(); NodeList= bookElement.getChildNodes
    ();

Element chapter= (Element) list.item(1); String title=
    chapter.getAttribute("title");                          (2)
```

The document.getDocumentElement( ) method accesses the root node of the document, the getChildNodes( ) method accesses the child nodes of the first element, which the DTD (1) defines as the table of contents ("contents"), and the list.item(1) accesses the first child or chapter node, which is the "Background Chapter." The method chapter.getAttribute ("title") obtains the title of the element at the first child node, which is "Background Chapter". Thus, in order to access an element using current DOM interface techniques, the user must know beforehand the mapping between the name and position (e.g., the first node is a chapter element) of each node of the tree to reach the desired node.

There is thus a need in the art to provide an improved method, system, and program for accessing elements within a document, such as an XML document, and manipulating the elements.

SUMMARY OF THE PREFERRED EMBODIMENTS

The current DOM interface requires that the user know the exact node in the hierarchical tree structure including the element the user wants to access. This requires that the user utilize methods to traverse the tree to a specific node. In complex documents including numerous elements at many different hierarchical levels, encoding the methods to traverse the DOM tree to a particular node may be substantially complex.

To overcome the limitations in the prior art described above, preferred embodiments disclose a method, system, and program for generating an interface to elements in a document. The document defines a relationship of the elements and at least one attribute for each element. A class is generated for at least one element to implement methods from information provided on elements in the document and a mapping indicating at least one element in the document to map to a class. The at least one indicated element in the document for which the class is generated can be accessed and affected by the methods implemented in the class.

In further embodiments, the relationship of the elements in the document are arranged in a hierarchical relationship such that the methods in one class generated for the element allow a user to directly access and affect the element.

In still further embodiments, extended attributes are defined for at least one element and the class for the indicated element is instantiated from the defined extended attributes.

In yet further embodiments, defined extended attributes are serialized into memory. The serialized defined extended attributes are capable of being deserialized from the memory to instantiate the element class to implement the defined extended attributes.

Preferred embodiments provide a method, system, and program for generating an interface to elements in a document to allow a user to directly access the element using methods generated specifically to access the element. A class is generated for certain selected elements. Each element class implements methods which allow the user to modify instances of the element in a document. Further, a user may specify user defined methods and attributes to apply to an element class to implement user-defined methods and attributes for the element class. Preferred embodiments provide an improved technique for accessing elements from a document, especially documents that define elements in a hierarchical relationship. In this way, the user may use the generated methods of an element class to access instances of the element without having to use an interface requiring traversal of the hierarchical elements to process a desired element.

BRIEF DESCRIPTION OF THE DRAWINGS

Referring now to the drawings in which like reference numbers represent corresponding parts throughout:

FIG. 4 illustrates an XML document processed in accordance with preferred embodiments of the present invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
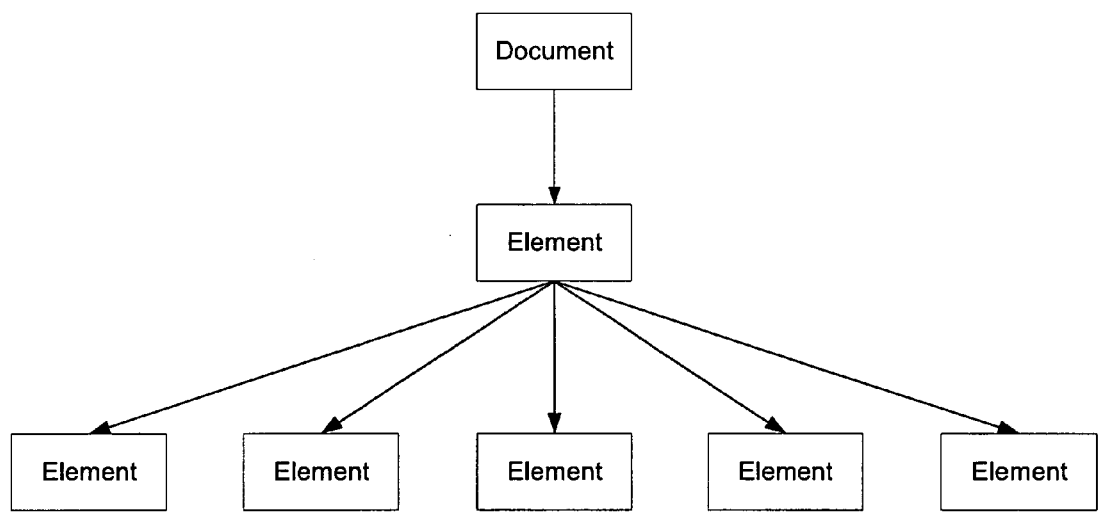
FIG. 1 is an illustration of a hierarchical tree structure of how current DOM API interfaces provide access to the elements of an SGML document.
Figure 2:
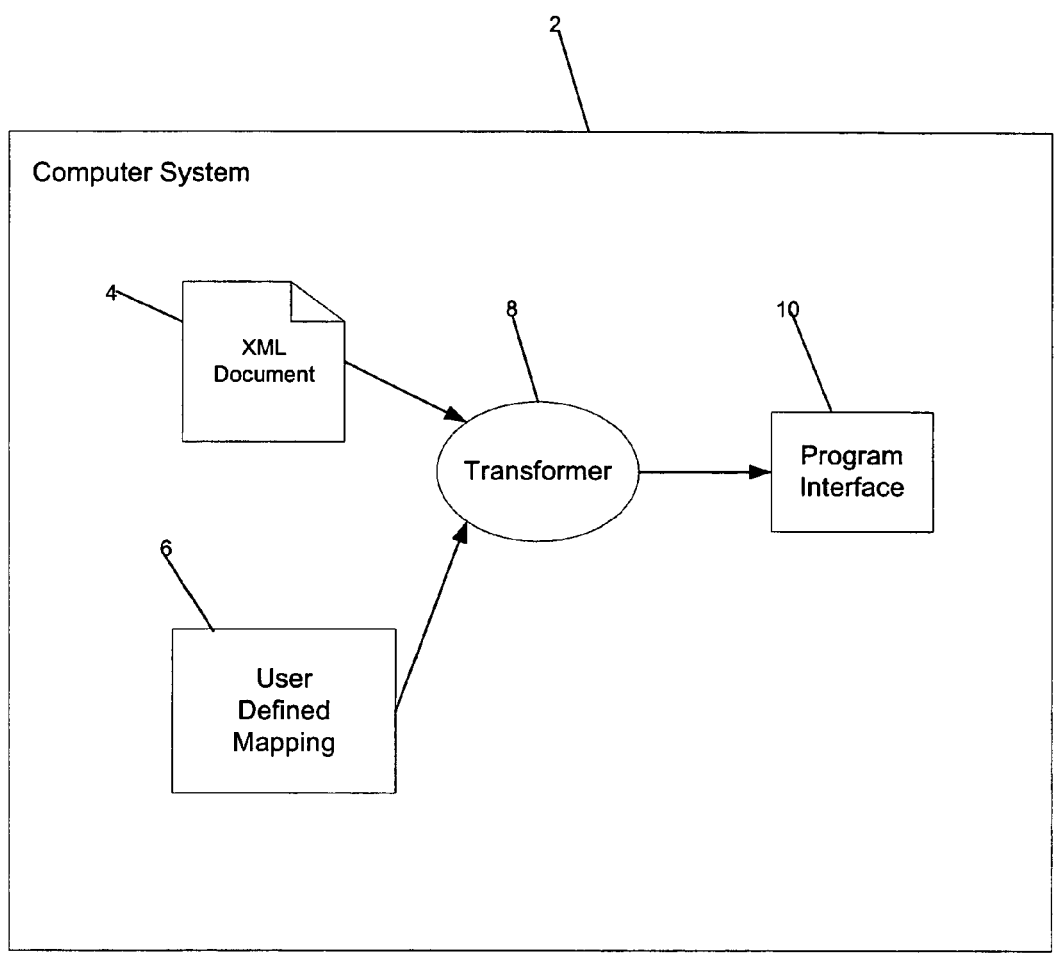
FIG. 2 illustrates an arrangement of program components in accordance with preferred embodiments of the present invention.

FIG. 2 illustrates the program elements in which preferred embodiments are implemented. A computer system 2, which may comprise any computer system known in the art including volatile and non-volatile memory areas, includes an XML document 4, user defined mapping 6, transformer 8, and a program interface 10. The program interface 10 provides a specification of methods that are implemented for elements specified in the user defined mapping 6. The transformer 8 reads in the contents of the XML document 4, which includes a hierarchical arrangement of elements, and a user defined mapping 6 which maps the elements to methods that have a specific name or type for the element. The user defined mapping 6 provides interface mapping for the elements defined in the XML document 4, such as property data type, property naming, etc.

In preferred embodiments, the program interface 10 is comprised of an object oriented class for each element and methods and interfaces to use to access and modify the classes of elements using the names provided by the user defined mapping 6. In preferred embodiments, an object oriented programming language, such as Java, is used to implement the class and methods in the class. The methods for the class may be defined by an interface. A class implements an interface by implementing all the methods contained in the interface. The transformer 8 produces an interface/class for each of the elements defined in the XML document 4. The transformer program 8 produces a JAR file including all the interfaces, classes, icons of the objects generated for the elements in the XML document 4. In preferred embodiments, the transformer 8 may be implemented as a JAVA Bean. A Java Bean is a reusable software component that can be manipulated visually in a builder tool.

**Java and Java Bean are trademarks of Sun Microsystems, Inc.;

The transformer 8 generates methods and interfaces to the particular elements in the XML document 4. For instance, if the user defined mapping provided properties, such as book for the document, and contents and chapters for the other elements, then the transformer 8 would generate methods that would allow the user to directly access, perform operations, and define attributes directly to one of the elements. The methods generated from the properties applied to the elements could be used in the code (3) below:

```
BookInt book= new BookImp(document); ChapterInt
    chapter= book.getChapter(0);

String title= chapter.getTitle();                       (3)
```

The method book.getchapter is part of the generated program interface 10 for the chapter elements. With the code (3), the user may use a method to directly access data from one particular chapter element without having to use methods to traverse the hierarchical arrangement of the elements in the DOM.

As discussed in the Description of the Related Art, to access a chapter by traversing the tree in a manner known in the art, the following code (2) is used:

```
Element bookelement= document.getDocumentEle-
    ment(); NodeList list= bookelement.getChildN-
    odes();

Element chapter=(Element) list.item(1); String title=
    chapter.getAttribute("title")                       (2)
```

As can be seen, the code (3) from the preferred embodiment program interface 10, including the class and interfaces, reduces code complexity and provides a more direct method for the user to access a particular element in the XML document 4. In this way, methods would be generated to directly access the particular XML elements, e.g., book, title, chapter. For instance, a method getchapter could be used to access a particular chapter directly instead of having to use multiple DOM API commands to traverse the hierarchical arrangement of elements.

The user defined mapping 6 includes a user defined mapping element (UDM) and a mapping element. The user defined mapping element includes the following parameters:

to: this attribute specifies the XML document for which the mapping is defined, such as the URL of the XML document.

id: specifies an id value for the UDM.

beanIcons: specifies Bean icons used for generated beans in program interface. The icon may be used to represent the program interface or beans in a visual development tool.

beaninfoClass: provides information on the properties, methods, and events for the program interface 10.

BeansDisabledElements: Elements in the XML document that are not affected by the transformer 8, that is no classes will be generated for these disabled elements.

BeansEnabledElements: specified elements in the XML document that are involved in the transformation, that is classes are generated for these elements.

Jar file info: indicates a name and path of where to generate the JAR (Java Archival File) including the program interface 10 for the enabled elements in the XML document 4.

The mapping element contains user-defined mappings for specific elements in the XML document. The mapping element would contain the same id as the UDM for which it is associated. A set of the following attributes are included in the mapping element for each element in the XML document 4 for which a class and interface will be generated.

to: specifies an element in the XML document for which the following attributes apply, which is one of elements enabled in the UDM element.

interfaceName: specifies the generated interface name for the element. The default value is the same as the name of the element in the XML document, e.g., book, title, chapter.

className: specifies the generated class name that implements the interface from the interface name.

attributeDatatypes: specifies attributes of data types within the XML element. Each element may have multiple data types. For instance, an element for a product may include a price as well as other information on the product, e.g., capabilities, units, inventory number, size, etc. The value of this attribute consists of pairs of names, including the name of the element followed by the name of the data type to be mapped. The data types to which an attribute may be matched include, boolean, byte, double, float, integer, long, short, etc.

The transformer 8 processes the user defined mapping to determine the elements in the XML document 4 that will be subject to the mapping and the mapping element instructs the transformer 8 on how to map each element to an element class and element interface. The mapping element may define attributes of data types of the elements.

By defining which elements are involved in a user defined mapping, preferred embodiments may map subelements of an element to their own class and interface such that the subelements do not inherit the properties of the parent element. For instance, a department element within an XML document including departments of a corporation may have attributes such as the address of the department, department ID, main contact telephone number, etc. Thus, attributes are properties of an element that have string values. The department element may include employee subelements for each employee within the department. Each employee subelement may include its own attributes, such as employee name, home address, age, position, etc. The transformer 8 would generate methods for accessing and manipulating each attribute and subelement within the general element. As can be seen the element department has properties, i.e., attributes, that are entirely different from the properties of the element employees within each department.

By default, the transformer 8 may generate methods for each class of elements enabled in the user defined mapping 6. In the below description of the methods generated by the transformer 8, XXX refers to a class of elements and xxx refers to a particular instance of the element. For instance, and XML document may include a class of elements such as products (XXX) and multiple instances (xxx) of the products, e.g., phones, computers, printers, etc. Below are methods that may be generated by the transformer 8 by default:

addXXX(xxx): adds the instance xxx to the element XXX following the last such element of the class XXX.

insertXXX(xxx, n): inserts the element xxx at the nth location within the XML document. For instance, if there are five XXX elements and n=3, then the new element xxx will be added as the third XXXth type element within the XML document.

removeXXX(xxx): Removes the element xxx from the class of elements XXX.

removeXXX(n): removes the nth element of the class of elements XXX from the XML document. For instance, if there are five instances of the chapter element, then this method may be used to selectively remove one of the chapter elements.

removeAllXXX( ): removes all elements of the class XXX within the XML document.

if (containsXXX(xxx)): determines whether the XML document includes the instance xxx of the class XXX of elements.

In preferred embodiments, a user may also extend the behaviors and properties of a class of an element generated with the transformer 8. The user may create a file to include user defined class behavior, methods, and data types for an element. The user defined class settings may be referred to as MyXXX. The user can then instantiate the class XXX from the user defined class MyXXX as opposed to the default class generated by the transformer 8. The user may specify customized settings and behavior for a class of elements in a file that is used to instantiate the class. Alternatively, the use may specify customized settings at runtime through a graphical user interface (GUI).

If states, such as elements, attributes, and subelements are added, preferred embodiments provide a mechanism for serializing added elements, attributes, and subelements. In Java, objects within a class are serialized such that they are stored and read into memory together to ensure that all interrelated objects of a class are loaded into memory and stored together only once. For instance, if different objects reference the same object, then storing both objects would also store the referenced object twice. To avoid storing multiple instances of an object, each object is provided a serial number. When storing an object, a determination is made if the serial number for the object is stored, and a reference is written indicating that the object was previously stored. Thus, when storing an object, the first reference to an object results in the object being serialized. Deserialization refers to the process of reading from an input stream an object and references to other objects as they occur. In this way, object serialization stores all objects and referenced objects in a single container. Preferred embodiments provide a serialization technique that only writes modifications to an XML document using the above described methods. Thus, if the behavior of an element class is extended with a user defined class, the preferred embodiments serialize those new states and interfaces added to the XML file. In this way, the new elements, attributes, subelements, and behaviors the user adds are serialized. Elements already within the XML document are not serialized. For instance, when customizing a class with a user defined class MyXXX, the user defined behaviors and settings are serialized in a new file. This serialized new file may then be subsequently opened with method calls to instantiate the class with the user defined elements that were serialized in the new file. This allows the user to enter customized behaviors using a graphical user interface (GUI) which would then be serialized in a file that may be used when later instantiating the class to provide the user defined settings. With this serialization technique, the customized or user defined behaviors and attributes may be distributed over a network to other users who have the XML document and mapping to allow sharing of customized settings without having to transmit the entire XML document 4.

The XML document 4 and user defined mapping 6 together define the default classes and methods for the elements within the XML document 4. The data types of attributes for the elements would have the string value. If a user specified data types and class behaviors, then such non-default, customized behaviors would be serialized into a file. Later, when the default XML document 4 and user defined mappings 6 are instantiated, the customized behaviors can be deserialized and read into memory to be accessible when using the instantiated default classes and behaviors for the XML document.

With preferred embodiments, a user may specify in the user defined mapping 6 attributes for the mapped data types. By default, the attributes (properties) of an element are string values. The user defined mapping 6 may indicate that an attribute is of a data type such as boolean, a byte, double, float, integer, long, short, date, vector, etc. User defined data types may also be defined in customized class files, such as MyXXX.

Figure 3:
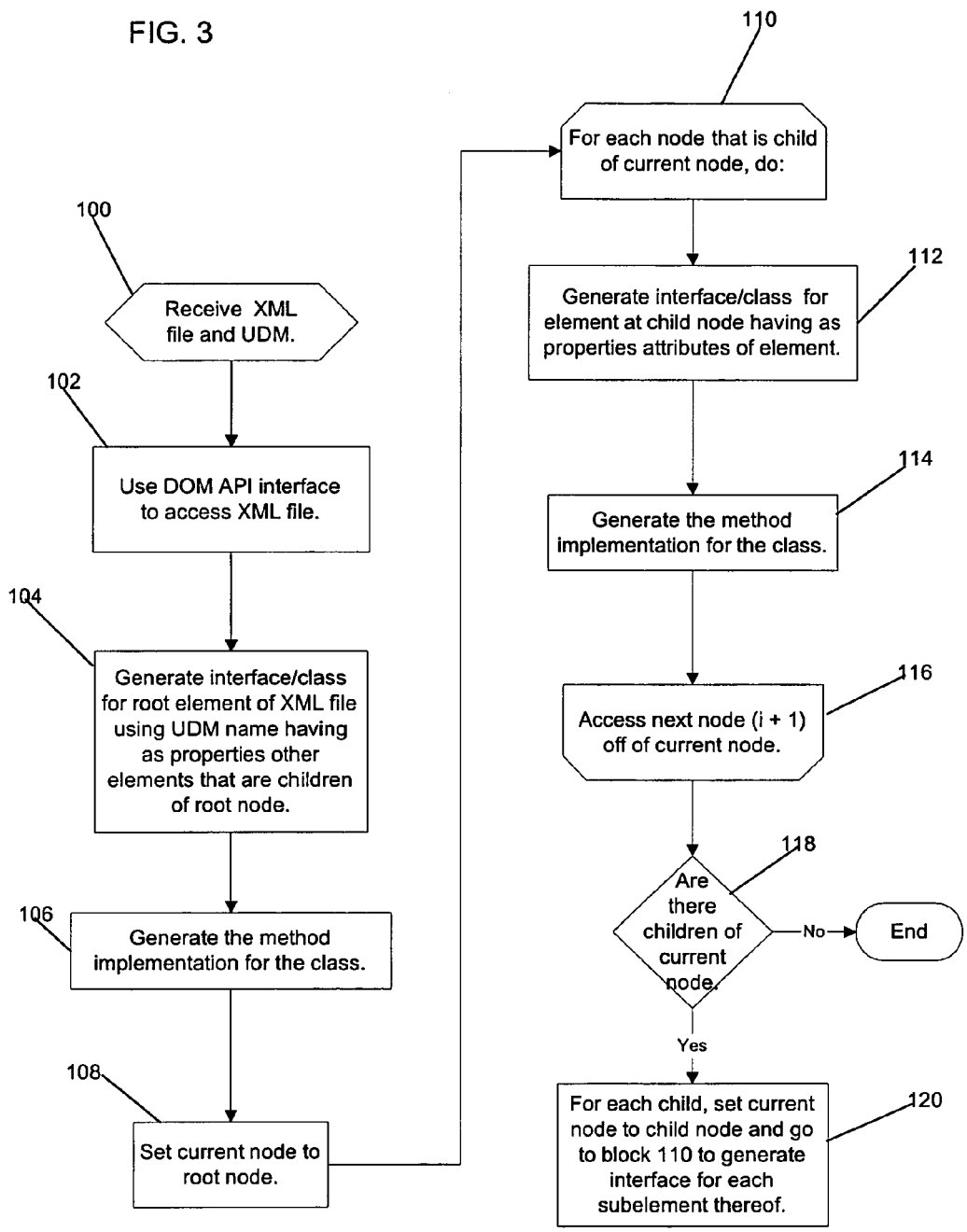
FIG. 3 illustrates logic implemented in a program component to transform elements to a program interface in accordance with preferred embodiments of the present invention.

FIG. 3 illustrates logic implemented in the transformer 8 to generate classes from the elements in an XML document 4 based on the user defined mappings 6. Control begins at block 100 with the transformer 8 receiving an XML document 4 and user defined mappings 6. The transformer 8 uses a DOM API interface to access the elements in the XML document 4. The transformer 8 then generates (at block 104) an interface/class for the root element of the XML document 4, which may be the title of the XML document having as properties the elements that are children of the root node. The transformer 8 further generates (at block 106) methods for the root node class to allow the user to directly access the root element of the XML document 4, such as the methods for modifying or adding to the root element discussed above. The transformer 8 sets (at block 108) a current node to the root node and begins a loop at block 110 for each element that is a child node of the root node. For each child node, the transformer 8 generates (at block 112) an interface/class for the element at the child node having as properties attributes of the element, which would include subelements and attributes of the child node. Methods for the class, such as the methods described above, are also implemented (at block 114). If there are further elements at child nodes of the current node (at block 116), then control returns (at block 120) to block 110 to generate a class/interface for the element at the child node. If a child node has additional elements enabled in the user defined mapping (at block 118), then the logic of FIG. 3 would recursively generate classes for further subelements within the XML document 4. The logic of FIG. 3 may further be modified to perform additional operations in accordance with the UDM element and mapping element discussed above.

After generating the classes, the transformer 8 may then instantiate the classes for the elements using default instantiation or using a user defined instantiation. Further, the user may cause the transformer 8 to customize the default program interface 10 to modify a generated class name, interface name, instantiation classes, and property data types.

FIG. 4 illustrates an example of an XML document 150 defining a catalog including as elements personal computer (PC) products. The root node is the "catalog name" that has as properties name and the element Item. Element Item is a subelement of the catalog element, that has as properties "type", "id", "sub-type", "serial", "description", "specification", and "price". Specification is an element that has as properties "processor", "memory", and "diskdrive". Further subelements include: Processor having properties "type", "speed", and "unit"; Memory having properties "type," "size", and "unit"; diskdrive having properties "type," "size", and "unit"; and price having properties "value" and "unit."

Figure 5:
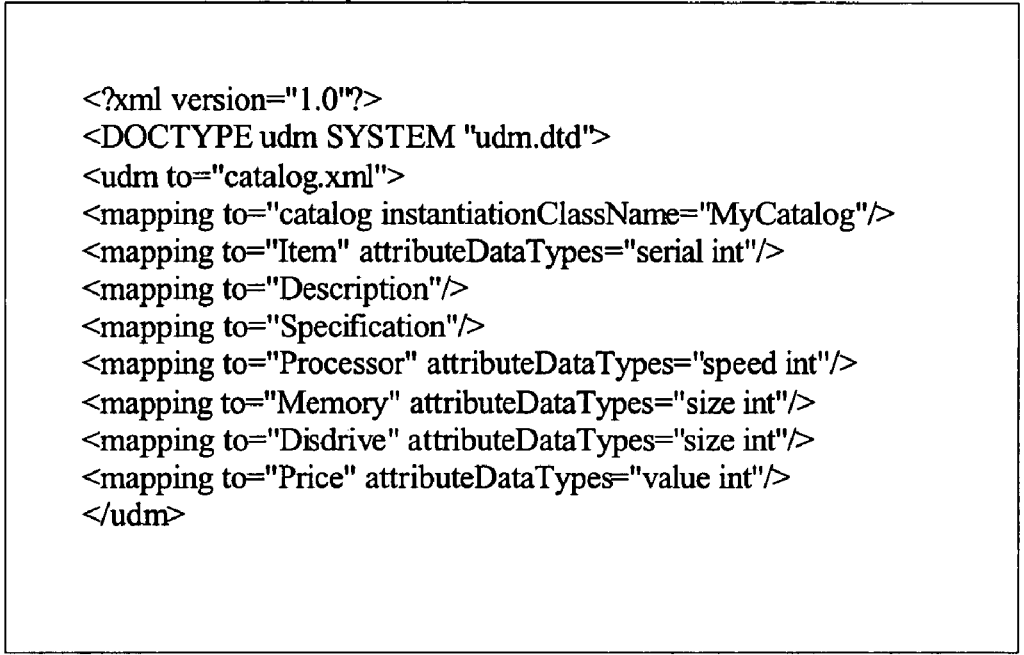
FIG. 5 illustrates a user defined mapping used to generate a program interface for an XML document in accordance with preferred embodiments of the present invention.

FIG. 5 illustrates a user defined mapping 160 that could be used to map the elements in the catalog XML document 150 to various methods. The mapping maps the elements Catalog, Item, Description, Specification, Processor, Memory, Diskdrive, and Price to classes. The mapping 160 further customizes data types for certain of the attributes, such as serial for Item, speed for Processor, etc. The mapping of 160 maps the elements to a class name which is the same as the element name provided in the XML document 150. If a data type is not defined, then the value for the attribute or property is a string. Further, the class Catalog is instantiated from a user defined file MyCatalog as opposed to a default instantiation. The instantiation MyCatalog may define further extended behaviors or methods for the classes of the other elements that are not provided by default.

Preferred embodiments provide a technique for generating a program interface to the elements within a document, such as an XML document, that allows users to directly manipulate the elements and define further behaviors and attributes for such elements. Preferred embodiments provide a strong type naming of methods to the elements. This is advantageous over the DOM interface that requires the user to use commands to traverse a series of nodes to reach a particular node. With the preferred strong type naming methods, users may directly access an element node within the tree. One advantage of the strong type naming technique is that when a user issues one of the preferred embodiment methods to access and manipulate an element, the compiler can recognize any error in the use of the method immediately. However, with the DOM technique if the user correctly uses the commands to traverse the tree but is not traversing to the desired node, then such error will not be recognized until runtime.

In this way, preferred embodiments provide an improved method, system, and program for accessing elements within a document.

ALTERNATIVE EMBODIMENTS/CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments described generating a method to access elements within a document arranged in a hierarchical fashion. However, in alternative embodiments, the elements do not have to be in a hierarchical relationship to one another and may be accessible through interfaces other than the DOM interface.

Preferred embodiments of the transform 8 program and other program components were described as implemented in the Java programming language and using Java Bean technology. However, other object oriented programming languages or other non-object oriented programming languages may be used to implement the transformer 8 and perform the operations of providing methods to directly operate on elements in an XML document.

Preferred embodiments were described as providing an interface to elements within an XML document. However, the preferred embodiments may apply to any document type, such as Dynamic Hypertext Mark-Up Language (DHTML), the Extensible Markup Language (XML), Cascading Style Sheets, any other Standard Generalized Markup Language (SGML), or any other language known in the art for creating interchangeable, structured documents. In yet further embodiments, the requested file may be in any other file format, i.e., other than an SGML type format, capable of being displayed or otherwise executed by the requesting client.

The program interface of the preferred embodiments that provides direct access to elements in the XML document is implemented in Java methods. However, any other program calls or interfaces could be used to implement the controls that provide direct access to the elements in the document to allow the user to more readily and directly manipulate the elements in the document.

Preferred embodiments described particular methods that could be generated for each class of elements. However, the default methods generated may include any methods that could be used to manipulate or otherwise affect the elements in the XML document.

In summary, preferred embodiments disclose a method, system, and program for generating an interface to elements in a document. The document defines a relationship of the elements and at least one attribute for each element. A class is generated for at least one element to implement methods from information provided on elements in the document and a mapping indicating at least one element in the document to map to a class. The at least one indicated element in the document for which the class is generated can be accessed and affected by the methods implemented in the class for generating an interface to elements in a document.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating an interface to elements in a document, wherein the document defines a relationship of the elements and at least one attribute for each element, comprising:

providing a mapping indicating at least one element in the document to map to a class and interface to generate for the class, wherein the interface defines methods to access the element for which the class is generated, and wherein each element comprises a logical part of the document having a marked start and end; and generating the class and the interface implementing methods for the at least one element from information provided on elements in the document and the mapping, wherein the at least one indicated element in the document for which the class is generated can be accessed and affected by the methods implemented in the class.

2. The method of claim 1, wherein the mapping includes a class name for each indicated element.

3. The method of claim 1, wherein the mapping indicates a data type for at least one attribute of the indicated element.

4. The method of claim 1, wherein the relationship of the elements in the document are arranged in a hierarchical relationship, and wherein the methods in the at least one class generated for the element allow a user to directly access and affect the element in the document.

5. The method of claim 4, further comprising accessing the at least one element in the document indicated in the mapping using a hierarchical application program interface (API), wherein one class is generated for each accessed element.

6. The method of claim 1, wherein the methods implemented in the class include at least one method that is a member of the set of methods comprising: adding an instance of the element, inserting an instance of the element at a location in the document with respect to other instances of the element in the documents, and removing an instance of the element from the document.

7. The method of claim 6, further comprising serializing defined extended attributes into memory, wherein the defined extended attributes are capable of being deserialized from the memory to instantiate the at least one element class to implement the defined extended attributes.

8. The method of claim 1, further comprising defining extended attributes of at least one element and instantiating the class for the at least one indicated element from the defined extended attributes.

9. The method of claim 8, wherein the defined extended attributes define further methods for the class.

10. The method of claim 1, wherein the document comprises an Extended Markup Language (XML) document.

11. A system for generating an interface to elements in a document, comprising:

a memory including:

(i) the document, wherein the document defines a relationship of the elements and at least one attribute for each element, and wherein each element comprises a logical part of the document having a marked start and end; and (ii) a mapping indicating at least one element in the document to map to a class and an interface to generate for the class;

means for generating the class and the interface implementing methods for the at least one element from information provided on elements in the document and the mapping, wherein the at least one indicated element in the document for which the class is generated can be accessed and affected by the methods implemented in the class.

12. The system of claim 11, wherein the mapping includes a class name for each indicated element.

13. The system of claim 11, wherein the mapping indicates a data type for at least one attribute of the indicated element.

14. The system of claim 11, wherein the relationship of the elements in the document as arranged in a hierarchical relationship, and wherein the methods in the at least one class generated for the element allow a user to directly access and affect the element in the document.

15. The system of claim 14, further comprising means for accessing the at least one element in the document indicated in the mapping using a hierarchical application program interface (API), wherein one class is generated for each accessed element.

16. The system of claim 11, wherein the methods implemented in the class include at least one method that is a member of the set of methods comprising: adding an instance of the element, inserting an instance of the element at a location in the document with respect to other instances of the element in the document, and removing an instance of the element from the document.

17. The system of claim 16, further comprising means for serializing defined extended attributes into memory, wherein the defined extended attributes are capable of being deserialized from the memory to instantiate the at least one element class to implement the defined extended attributes.

18. The system of claim 11, further comprising:
   means for defining extended attributes of at least one element; and
   means for instantiating the class for the at least one indicated element from the defined extended attributes.

19. The system of claim 18, wherein the defined extended attributes define further methods for the class.

20. The system of claim 11, wherein the document comprises an Extended Markup Language (XML) document.

21. An article of manufacture for use in generating an interface to elements in a document, wherein the document defines a relationship of the elements and at least one attribute for each element, the article of manufacture comprising computer readable storage media including at least one computer program embedded therein that is capable of causing a processor to perform:
   providing a mapping indicating at least one element in the document to map to a class and an interface to generate for the class, wherein the interface defines methods to access the element for which the class is generated, and wherein each element comprises a logical part of the document having a marked start and end; and
   generating the class and the method implementing methods for the at least one element from information provided on elements in the document, wherein the at least one indicated element in the document for which the class is generated can be accessed and affected by the methods implemented in the class.

22. The article of manufacture of claim 21, wherein the mapping includes a class name for each indicated element.

23. The article of manufacture of claim 21, wherein the mapping indicates data type for at least one attribute of the indicated element.

24. The article of manufacture of claim 21, wherein the relationship of the elements in the document are arranged in a hierarchical relationship, and wherein the methods in the at last one class generated for the element allow a user to directly access and affect the element in the document.

25. The article of manufacture of claim 24, further comprising accessing the at least one element in the document indicated in the mapping using a hierarchical application program interface (API), wherein one class is generated for each accessed element.

26. The article of manufacture of claim 21, wherein the methods implemented in the class include at least one method that is a member of the set of methods comprising: adding an instance of the element, inserting an instance of the element at a location in the document with respect to other instances of the element in the document, and removing an instance of the element from the document.

27. The article of manufacture of claim 26, further comprising serializing defined extended attributes into memory, wherein the defined extended attributes are capable of being deserialized from the memory to instantiate the at least one element class to implement the defined extended attributes.

28. The article of manufacture of claim 21, further comprising defining extended attributes of at least one element and instantiating the class for the at least one indicated element from the defined extended attributes.

29. The article of manufacture of claim 28, wherein the defined extended attributes define further methods for the class.

30. The article of manufacture of claim 21, wherein the document comprises an Extended Markup Language (XML) document.

* * * * *